Patented June 13, 1939

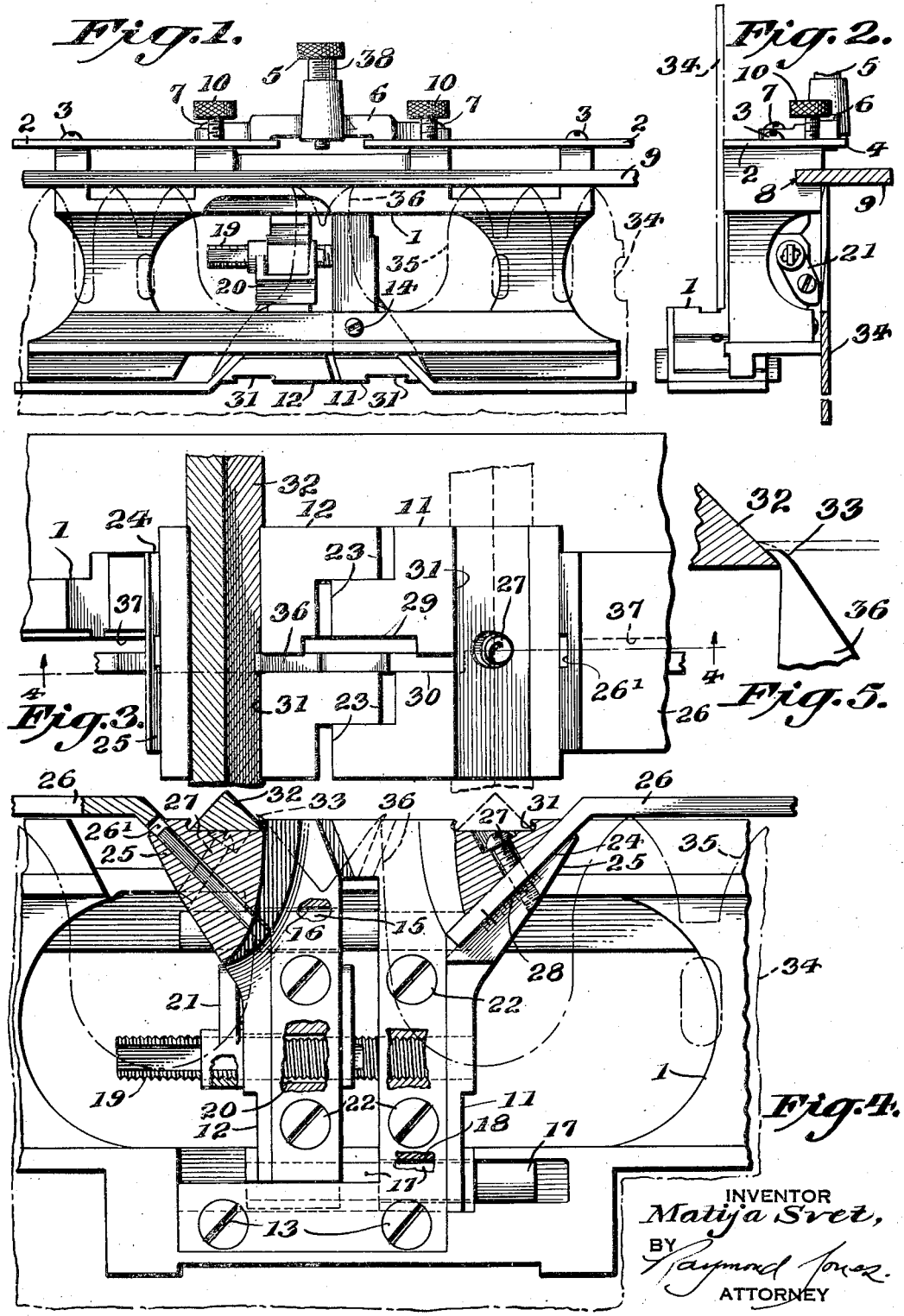
June 13, 1939. M. SVET 2,162,037
SAW FILING TOOL AND GAUGE
Filed Jan. 4, 1938

2,162,037

UNITED STATES PATENT OFFICE 2,162,037

SAW FILING TOOL AND GAUGE

Matija Svet, Sheffield, Pa.

Application January 4, 1938, Serial No. 183,366

8 Claims. (Cl. 76—46)

My invention relates to a saw filing tool and gauge and has for its main object to provide a tool having means for receiving a file and permitting operation thereof to file on either side and below the points of the raker teeth of a timber saw.

Another object is to provide in a saw filing tool a pair of slots adapted to receive a raker tooth, one of which slots is arranged to clamp the tooth in position to file off the teeth thereof, the other slot being arranged to permit filing on the sides of the tooth.

Another object is to provide a novel arrangement of gauge plates which may be adjusted to desired positions to engage the cutter teeth of a saw and permit the positioning of a raker tooth for a filing operation thereon.

Other objects will appear in the specification which follows and the accompanying drawing, wherein—

Figure 1 is a side elevation of a filing tool showing the teeth of a saw in position against a file for a jointing operation;

Fig. 2 is an end view of the parts shown in Fig. 1;

Fig. 3 is an enlarged plan view of a two-part raker tooth clamp or filing block;

Fig. 4 is a view, partly in section and showing in detail, my novel filing clamp blocks; and Fig. 5 shows, in detail, how a three-cornered file is operative in my device to file below a tooth point.

The main portion of the tool disclosed comprises an integral frame 1 which is cut away and formed to support the various elements that cooperate therewith. A pair of plates 2 is secured by screws 3 to the frame 1 along one side edge thereof to overhang, as at 4, one side of the frame. A gauge screw 5 is threadably mounted in a bracket 6 attached by screws 7 to each plate 2. A slot 8 is formed along one side of the frame 1 just below the plates 2 to receive a flat file 9 to be used in jointing the saw teeth. The file 9 is clamped in its slot 8 by means of thumb screws 10 threaded through the plates 2.

A pair of raker tooth filing and clamping blocks 11—12 is supported adjacent the mid-portion of the frame 1. These blocks may be removed as a unit by removing the two screws 13 on one side of the frame and a screw 14 on the opposite side of the frame. A pin 15 riveted in block 11 extends through a hole 16 in block 12 and a pin 17 riveted in block 12 extends through a hole 18 in block 11. The block 12 is slidable away from block 11 by means of these pins acting as guides. A threaded pin 19 fixed to block 11 extends through a hole 20 in block 12. A U-shaped member 21 is threaded to rotate on the pin 19 and acts as a nut to fix or clamp the block 12 at any point along the pin 19. The blocks 11 and 12 are each made in two parts, each of the rear parts carrying the pins 15 and 17 and cooperating holes 16 and 18. The screws 22 serve to hold the front and rear parts of the blocks together.

The upper end of each block is formed with a pair of extensions 23 at each side that function as guides. The upper end of each block is slotted at 24 entirely through the block close to its side to leave a thin springy portion 25 at each side. In each slot 24 is positioned a gauge plate 26. A screw 27 serves to pull the portions 26 closer to a respective block to clamp the plates 26 at any desired position. Each inner end of a plate 26 is split near its center to provide a slot 26' to straddle a respective screw 27. A gauge 28 is provided to indicate positions of the plate 26.

A narrow slot 29 and an adjacent wider slot 30 is formed half in each block 11—12. A file guide or track 31 is formed transversely along the upper face of each block to receive a three-cornered file 32 and hold same in position under the point 33 of a raker tooth when such tooth is positioned at either side of the wide slot 30.

In Fig. 1 and Fig. 2, a saw 34 is shown engaged with the tool with the cutting teeth 35 and the raker tooth 36 in contact with the file 9 for a jointing or leveling operation. In Fig. 3 and Fig. 4, the tool is engaged with a saw with the teeth 35 in contact with the plates 26 and with the raker tooth 36 projecting upwardly through the wide slot 30 at the left hand end thereof in which position the file 32 engages just below the point 33 of this tooth. Fig. 5 shows more in detail how the file 32 engages the point 33.

In operation, a flat file 9 is secured in the slot 9 by means of the screws 10. The tool is then applied to the upper points of the saw blade as shown in Fig. 1 and Fig. 2 and may be run back and forth over the teeth whereby the file 9 may level off all these teeth. The blade is now ready to be swaged, that is, each point 33 of the raker teeth is struck by the pein of a hammer to upset these teeth and drive these points downwardly somewhat as shown in Fig. 5, thereby shortening these teeth as compared to teeth 35.

It will be noted in Fig. 3 that the slot 29 is positioned close to the side face 37 of frame 1. The saw blade is then placed in contact with the frame 1 along the face 37 with a raker tooth 36 projecting up through the slot 29. The plates 26 are then moved up an amount determined by the gauge lines 28 and clamped by screws 27. With the tooth 36 in slot 29 projecting slightly above the top of blocks 11—12, the block 12 is moved to the right in Fig. 4 to clamp this tooth between the blocks, the block 12 then being clamped by the nut 21 on screw pin 19.

To determine the amount of shortening to be given to the teeth 36 according to the nature of timber to be cut, the gauge screw 5 is turned clockwise to move same downwardly an amount desired, say $\frac{1}{16}$ inch, as indicated by gauge lines 38. The tool is then placed on the blade with the teeth 35 contacting the plates 2 and a raker tooth point 33 under screw 5 to determine if this point is low enough as indicated by the tip of screw 5 touching this point.

The next and most important operation is to file under each point 33 of a raker tooth 36 whereby to impart to each point 33 a chisel-like cutting edge. The saw blade is tilted to move the tooth 36 from slot 29 into the wide slot 30 and the tool is moved to shift the tooth 36 to the left hand end of slot 30 as shown in Fig. 3. This position will permit the point 33 to overhang the adjacent file guide 31. A three-cornered file 32 is then engaged in the slot or guide 31 and moved back and forth to file under point 33. The tool is then moved to permit the tooth 36 to occupy the right hand end of slot 30 and this operation is repeated with a file 32 in the right hand guide 31 so that both points 31 on each tooth 36 are so filed.

It will be noted that I have provided a slot 29 formed in the blocks 11—12 wherein any width of tooth 36 may be clamped therein and filed on the tops of the points thereof, after which, the tooth 36 may be quickly moved into the wide slot 30 to be operated on at each end thereof with the file 32 with the result that such teeth may be filed very quickly and economically to level the same and impart a chisel-like cutting edge thereon.

While I have shown a pair of three-cornered file guides 31, it is to be understood that only one such guide may be provided since it is possible to reverse the tool on the saw blade and file under each point 31 using one guide according to the position of the tool. The drawings show slots 29—30 formed partly in each block 11—12. It is to be understood that slots may be used that are formed in one block only as a mechanical equivalent. The appended claims are drawn in scope to cover such variations and equivalents, and I do not desire to be limited to details shown on the drawing.

I include within the present invention the specific shape of tooth or point 33 shown in Fig. 5 wherein the upper face of the point extends at substantially a right angle to the side of the tooth and the lower face of each point being formed to extend at an acute angle to the upper face.

I claim:

1. A saw filing tool comprising a frame, said frame being provided with a two-element tooth clamp, said clamp being provided with a tooth retaining slot extending partly into each element, one of said elements being movable towards the other element to clamp a saw tooth in said slot, and a second tooth engaging slot formed partly in each element and being wider than the first-named slot, said slots being in communication with each other to permit a tooth to be moved from one slot to the other.

2. In a tool as set forth in claim 1 wherein the upper end of one of the clamp elements is provided with a file guide extending transversely of and closely adjacent the second tooth engaging slot.

3. A saw filing tool comprising a frame, said frame being provided with a two-element tooth clamp, one element being immovable on said frame, the other element being movable relatively to the other element, one element being provided with a tooth-engaging slot, said last-named element being provided with a second and wider tooth retaining slot, said movable element being movable to clamp a tooth in the first-named slot, said slots being adjacent each other and opening one to the other to permit said tooth to be passed from one slot to the other transversely thereof.

4. In a tool as set forth in claim 3, wherein one clamp element is provided with a file guide extending along one face thereof closely adjacent the wider slot and at a right angle thereto.

5. A saw filing tool comprising a frame, a pair of blocks mounted on said frame in side-by-side relation and having opposed faces extending at right angle to said frame, one of said blocks being movable on said frame away from the other block, one of the adjacent opposed faces of said blocks being recessed at a right angle thereto to provide a saw tooth receiving slot, said recessed block having and upper end face extending at substantially a right angle to said recessed face, said end face being provided with a file guide recess formed therein at a right angle to said slot, said slot and recess opening one into the other whereby a file positioned in said recess may engage the bottom edge of a saw tooth point positioned in said slot.

6. A saw filing tool comprising a body frame, a pair of blocks mounted on said frame in side-by-side relation and having opposed faces extending at a right angle to said frame, one of said blocks being movable on said frame away from the other block, the adjacent opposed faces of said blocks each being provided with a slot extending at a right angle to a respective face, said slots being aligned to receive a tooth of a saw, each block being provided with a gauge plate, each plate having a portion extending at a right angle to a respective face, and means for adjusting each plate on a respective block to move said plates in a direction at a right angle to said frame.

7. In a tool as set forth in claim 5, means for locking the movable block in any desired displaced position on the frame.

8. In a tool as set forth in claim 5, wherein one block is provided with an opening, the other block being provided with a guide pin extending therefrom, said pin engaging within said opening whereby to permit the first-named block to slide on said pin relatively to the other block.

MATIJA SVET.